United States Patent
Logan et al.

(10) Patent No.: US 9,664,037 B2
(45) Date of Patent: May 30, 2017

(54) DETECTION OF DOWNHOLE DATA TELEMETRY SIGNALS

(71) Applicant: EVOLUTION ENGINEERING INC., Calgary (CA)

(72) Inventors: Aaron W. Logan, Calgary (CA); Daniel W. Ahmoye, Calgary (CA); David A. Switzer, Calgary (CA); Jili Jerry Liu, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 14/770,368

(22) PCT Filed: Mar. 7, 2014

(86) PCT No.: PCT/CA2014/050199
§ 371 (c)(1),
(2) Date: Aug. 25, 2015

(87) PCT Pub. No.: WO2014/134741
PCT Pub. Date: Sep. 12, 2014

(65) Prior Publication Data
US 2016/0010446 A1 Jan. 14, 2016

Related U.S. Application Data

(60) Provisional application No. 61/774,398, filed on Mar. 7, 2013.

(51) Int. Cl.
*G01V 3/00* (2006.01)
*E21B 47/12* (2012.01)
(Continued)

(52) U.S. Cl.
CPC .......... *E21B 47/122* (2013.01); *E21B 17/003* (2013.01); *E21B 17/028* (2013.01);
(Continued)

(58) Field of Classification Search
CPC .... E21B 47/122; E21B 17/003; E21B 17/028; E21B 33/06; E21B 47/06; E21B 47/12; E21B 47/123; H04L 67/12; H04Q 9/00
(Continued)

(56) References Cited

U.S. PATENT DOCUMENTS 4,133,518 A * 1/1979 Clapper ............. B23K 37/0435
164/332
4,416,494 A * 11/1983 Watkins ................ E21B 17/003
175/45
(Continued)

FOREIGN PATENT DOCUMENTS

| EP | 2156015 | 2/2010 |
|---|---|---|
| WO | 0212676 A1 | 2/2002 |
| WO | 2014100264 A1 | 6/2014 |

*Primary Examiner* — Hai Phan
*Assistant Examiner* — Zhen Y Wu
(74) *Attorney, Agent, or Firm* — Oyen Wiggs Green & Mutala LLP

(57) ABSTRACT

An assembly for receiving telemetry signals from downhole equipment is located at a top end of a drill string above a drill rig floor. The assembly may be configured to receive multiple types of telemetry signals, for example, two or more of electromagnetic telemetry, mud pulse telemetry and drill string acoustic telemetry signals. The assembly may comprise a cap comprising a coupling and an end separated by an electrically insulating gap region. The end of the cap may be connected to a grounding system for the drill rig.

33 Claims, 5 Drawing Sheets

(51) Int. Cl.
  *H04L 29/08* (2006.01)
  *H04Q 9/00* (2006.01)
  *E21B 17/00* (2006.01)
  *E21B 17/02* (2006.01)
  *E21B 33/06* (2006.01)
  *E21B 47/06* (2012.01)
(52) U.S. Cl.
  CPC .............. *E21B 33/06* (2013.01); *E21B 47/06* (2013.01); *E21B 47/12* (2013.01); *E21B 47/123* (2013.01); *H04L 67/12* (2013.01); *H04Q 9/00* (2013.01)
(58) Field of Classification Search
  USPC .......................................................... 340/854
  See application file for complete search history.

(56) References Cited

U.S. PATENT DOCUMENTS

| | | | |
|---|---|---|---|
| 5,682,099 A * | 10/1997 | Thompson | G01V 3/30 324/338 |
| 6,427,124 B1 * | 7/2002 | Dubinsky | E21B 43/08 702/9 |
| 6,975,121 B2 | 12/2005 | Strack et al. | |
| 7,228,902 B2 | 6/2007 | Oppelt | |
| 8,242,928 B2 | 8/2012 | Prammer | |
| 8,286,728 B2 | 10/2012 | Veeningen | |
| 2005/0046589 A1 * | 3/2005 | Wisler | E21B 17/003 340/854.6 |
| 2006/0290528 A1 | 12/2006 | MacPherson et al. | |
| 2007/0051512 A1 * | 3/2007 | Markel | E21B 47/0905 166/255.1 |
| 2008/0281322 A1 * | 11/2008 | Sherman | A61B 18/1492 606/42 |
| 2010/0243325 A1 * | 9/2010 | Veeningen | E21B 17/028 175/40 |
| 2010/0323540 A1 * | 12/2010 | Zacharevitz | H01R 13/648 439/95 |
| 2011/0032117 A1 * | 2/2011 | Contant | E21B 17/003 340/854.4 |
| 2011/0060527 A1 * | 3/2011 | Teodorescu | E21B 47/01 702/9 |
| 2011/0168446 A1 | 7/2011 | Lemenager et al. | |
| 2012/0287596 A1 * | 11/2012 | Manion | G01D 4/002 361/816 |
| 2014/0069720 A1 * | 3/2014 | Gray | E21B 33/085 175/5 |
| 2014/0083730 A1 * | 3/2014 | Garcia | H02G 13/00 174/6 |
| 2014/0131036 A1 * | 5/2014 | Huval | E21B 47/09 166/255.3 |
| 2015/0068706 A1 * | 3/2015 | Hann | E21B 43/2408 165/45 |
| 2015/0292980 A1 * | 10/2015 | Veeningen | E21B 33/064 356/73.1 |

* cited by examiner

FIG. 1 – PRIOR ART

DETECTION OF DOWNHOLE DATA TELEMETRY SIGNALS

CROSS REFERENCE TO RELATED APPLICATIONS

This application claims priority from U.S. Application No. 61/774398 filed on 7 Mar. 2013. For purposes of the United States, this application claims the benefit under 35 U.S.C. §119 of U.S. Application No. 61/774398 filed on 7 Mar. 2013 and entitled DETECTION OF DOWNHOLE DATA TELEMETRY SIGNALS which is hereby incorporated herein by reference for all purposes.

TECHNICAL FIELD

This application relates to subsurface drilling, specifically to the detection of downhole telemetry signals. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore, which can potentially cause a blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electro-mechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measurement while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit. Some downhole probes are highly specialized and expensive.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing or when the flow is intermittent or fluctuating. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as EM signals are strongly attenuated over long distances through earth formations, EM telemetry can require a relatively large amount of power so that the signals can be generated with sufficient strength to be detected at the surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals for EM telemetry typically comprise very low frequency AC signals applied in a manner that codes information for transmission to the surface. The frequencies used are typically low because higher frequency signals are typically attenuated more strongly than lower frequency signals. The electromagnetic signals may be detected at the surface, for example by measuring electrical potential differences between the drill string or a metal casing that extends into the ground and one or more ground rods.

There remains a need for improved methods and apparatus for electromagnetic telemetry.

SUMMARY

This invention has a number of aspects. One aspect provides apparatus for detecting telemetry signals that is configured to be mounted at the top end of a kelly or in or immediately adjacent to a top drive. In some embodiments the apparatus is configured to receive telemetry signals of two or more telemetry modes. Another aspect provides methods for receiving telemetry signals generated by downhole apparatus, the methods comprise detecting telemetry signals at a top end of the drill string above the rig floor (for example at the top end of a kelly or at or immediately adjacent to a top drive). Another aspect provides a top drive having an integrated apparatus for detecting telemetry signals. Optionally the top drive comprises apparatus for generating downlink EM and/or MP telemetry signals.

One embodiment of the invention provides a signal receiving assembly. The signal receiving assembly comprises a first section and a second section. The first section is electrically insulated from the second section.

In some embodiments, the signal receiving assembly is located above ground.

In some embodiments, the second section comprises a coupling configured for coupling the second section to a drill string, the top end of a drill string, a kelly, or the top end of a kelly.

In some embodiments, the signal receiving assembly comprises a signal detector. The signal detector is electrically coupled to the first section and the second section, and the signal detector is configured to measure the difference in voltage between the first section and the second section.

In some embodiments, the signal receiving assembly comprises a bore through the first and section sections and the signal detector is mounted within the bore.

In some embodiments, the first section is electrically insulated from the second section by a gap sub, and a sleeve of insulating material lines at least a portion of the bore through the first and second sections. The sleeve of insulating material may be at least 1 inch (2.5 cm) long.

In some embodiments, the signal detector is configured to detect a signal from a pressure sensor and/or an acoustic sensor.

In some embodiments, the signal detector comprises an amplifier, an analog-to-digital converter, a network interface, a CPU controller, and a signal generator circuit.

In some embodiments, the signal generator circuit is configured to drive a voltage across the first and second sections.

In some embodiments, the signal generator circuit comprises a power supply and an H-bridge.

In some embodiments, the signal generator circuit is configured to drive a voltage across the first and second sections only when the pressure sensor detects at least a threshold pressure.

In some embodiments, the signal detector comprises an output that may be connected to a display. In some embodiments, the signal detector comprises an integrated display.

In some embodiments, the signal receiving assembly is mounted immediately adjacent to a top drive or within a top drive. In some embodiments, the signal receiving assembly is integrated with a top drive. In some embodiments, the signal receiving assembly shares a network interface with a top drive.

In some embodiments, the first section is electrically grounded and the second section is electrically connected to a section of drill string. In some embodiments, the first section is electrically grounded via a grounding system of a drill rig.

In some embodiments, the signal detector is electrically coupled to a blow out preventer, and the signal detector is configured to measure the difference in voltage between the first section and the blow out preventer.

In some embodiments, the signal detector is configured to measure the difference in voltage between the first section and the blow out preventer whenever the second section is not electrically coupled to a section of drill string.

One embodiment of the invention provides a telemetry apparatus. The telemetry apparatus comprises a signal receiving assembly comprising a first section and a second section, a drill string comprising a third section and a fourth section, a signal generator, and a signal detector. The first section is electrically insulated from the second section. The third section is electrically insulated from the fourth section. The signal generator is electrically coupled to drive a voltage across the third section and the fourth section. The second section is electrically coupled to the third section. The signal detector is electrically coupled to both the first section and the second section.

In some embodiments, the first portion is electrically grounded via a grounding system of a drill rig.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
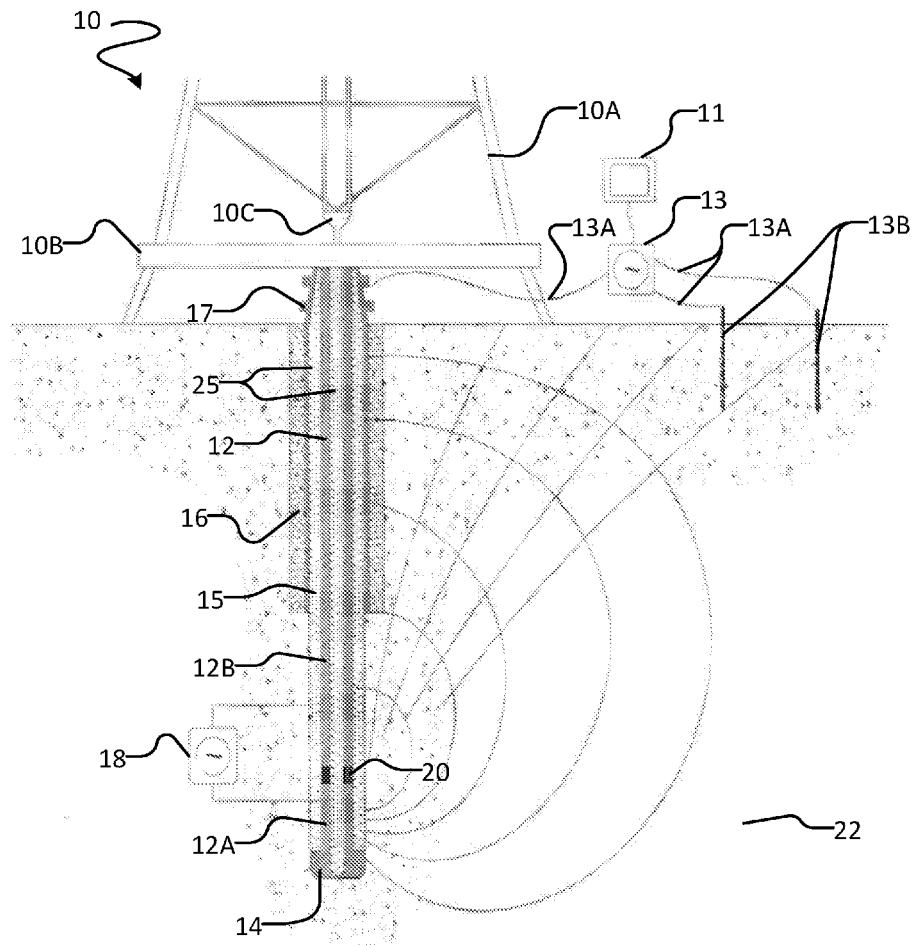
FIG. 1 is a schematic view of a prior art drilling operation with a downhole telemetry system.

FIG. 1 shows schematically an example drilling operation equipped with an electromagnetic telemetry system. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid 25. Drilling fluid 25 is pumped through a bore in drill string 12 to drill bit 14 and returns to the surface through annular region 15 carrying cuttings from the drilling operation. As the well is drilled, a casing 16 may be made in the well bore. A blow out preventer 17 is supported at a top end of the casing.

Drill string 12 includes a downhole gap sub 20. Downhole gap sub 20 electrically insulates a lower portion 12A of drill string 12, which is below downhole gap sub 20, from an upper portion 12B of drill string 12, which is above downhole gap sub 20. Lower portion 12A is connected to drill bit 14, and drill bit 14 is in contact with ground 22. Lower portion 12A is thereby electrically coupled to ground 22.

Upper portion 12B is electrically insulated from ground 22 by downhole gap sub 20 and by drilling fluid 25. Drilling fluid 25 is typically not a perfect electrical insulator. Consequently, some current may flow between upper portion 12B and ground 22.

A signal generator 18 is electrically connected across downhole gap sub 20 to both lower portion 12A and upper portion 12B. In FIG. 1, signal generator 18 is shown outside of drill string 12 for ease of illustration, but it is to be understood that signal generator 18 is typically located within drill string 12, often as part of a probe, built into a wall of gap sub 20, or the like.

Signal generator 18 generates a variable potential difference between lower portion 12A and upper portion 12B. Data (obtained by a probe or by other means) is encoded into a signal comprising a particular pattern of variations of potential difference. Most typically signal generator 18 imposes a low-frequency alternating signal across gap sub 20 such that the relative polarity of the upper portion 12B and lower portion 12A of the drill string alternate in polarity.

The variable potential difference results in signals that can be measured at the surface. Such signals manifest themselves as potential differences between the top of drill string 12 and ground potential. It is typical to provide a signal detector 13 at or near to the surface. Signal detector 13 is connected by signal cables 13A to electrical grounding stakes 13B and to blow out preventer 17 which is in contact with the top of drill string 12. A plurality of grounding stakes 13B is typically used. The installation of grounding stakes 13B is time consuming. Furthermore, grounding stakes and the connections between grounding stakes 13B and detector 13 may present a hazard to on-site personnel and may get in the way of the various tasks related to assembling, operating, and disassembling drill rig 10.

Through its electrical connections to grounding stakes 13B and blow out preventer 17, signal detector 13 may measure the variable potential difference resulting from the signals imposed between upper portion 12B and lower portion 12A by signal generator 18. The signals imposed by signal generator 18 may have amplitudes of ones, tens or hundreds of volts, for example. The signals received at signal detector 13 are typically in the millivolt range or lower. Received signals may be discriminated from background electrical noise taking account of the fact that the frequency or frequencies of the signals transmitted by signal generator 18 may be known. Information can thereby be sent from a downhole location by way of signal generator 18 to signal detector 13.

Figure 2:
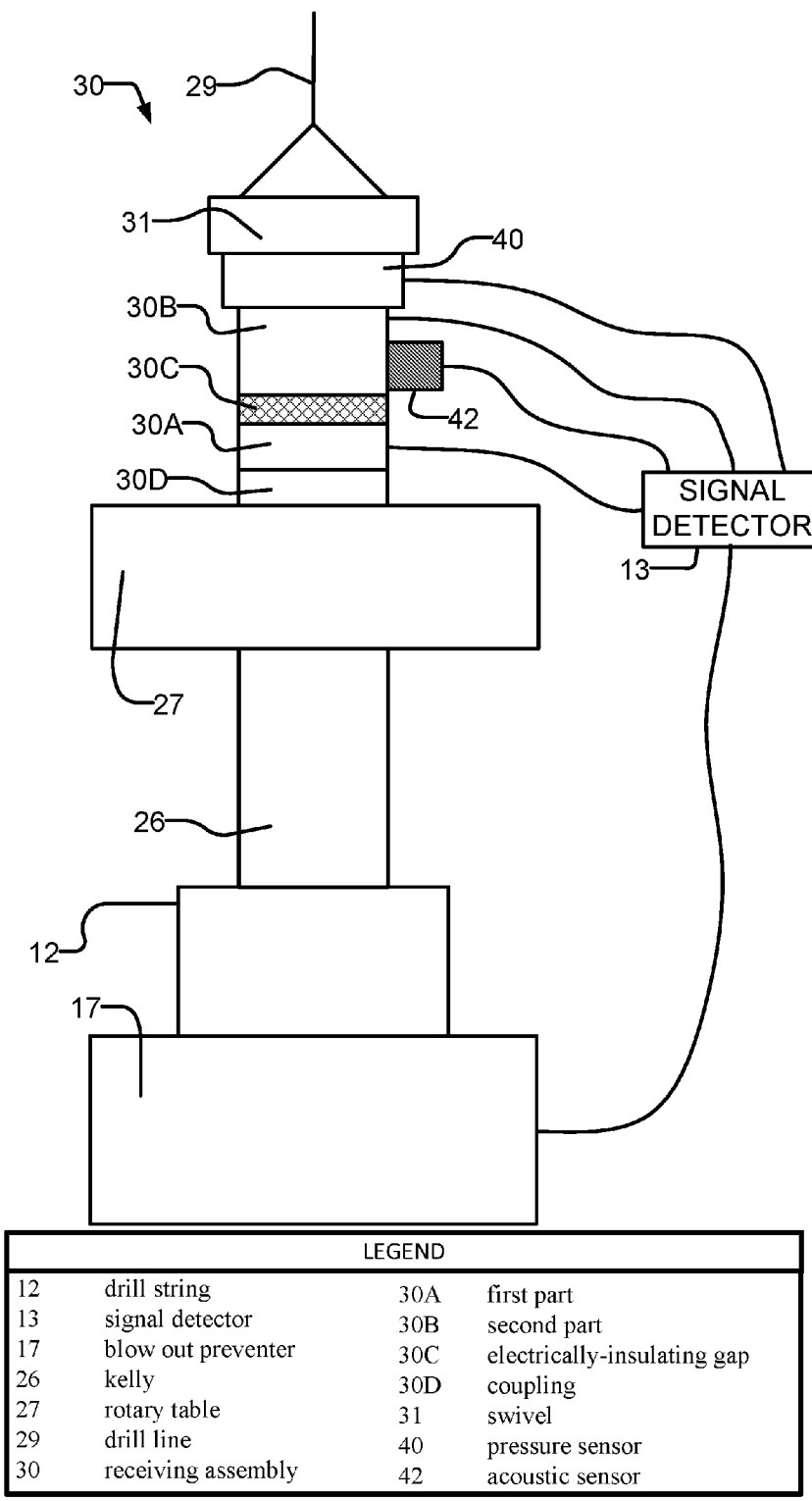
FIG. 2 is a schematic view of a portion of a drilling operation with a signal receiving assembly according to an example embodiment of the invention.

FIG. 2 shows schematically a portion of drill rig 10 according to according to an example embodiment of the invention. In this embodiment, instead of detecting transmitted signals at the level of the rig floor (e.g. at blow out preventer 17) signal detector 13 is connected to drill string at the top of drill string 12. For example, signal detector 13 may connect to drill string 12 at a location above kelly 26, in cases where a kelly is provided and/or at or just above or just below a top drive in cases where a top drive is provided. This location is advantageous because it keeps any cables and the like off of the rig floor. This location may also be advantageous because it reduces signal attenuation and noise. Furthermore, providing a signal detector at this location facilitates the provision of a single signal detector assembly that is configured to detect telemetry signals in multiple different telemetry modes. For example, the signal detector assembly may be configured to detect EM telemetry signals and/or MP telemetry signals and/or acoustic telemetry signals.

In some embodiments the drill rig comprises a system of one or more grounding structures (e.g. electrically conducting plates, rods or the like in contact with the earth) which provide electrical grounding for the drill rig and signal detector 13 is coupled to detect potential differences between the drill rig grounding system and the top end of the drill string. In such embodiments, there is no need to use additional EM antennas. The drill rig grounding system may be connected to the metal structure of the drill rig. In such embodiments signal detector 13 may be coupled directly to the drill rig grounding system by way of a separate cable or may be connected to the drill rig grounding system by way of one or more electrically conducting components of the drill rig.

In the illustrated embodiment, drill string 12 extends through blow out preventer 17 and connects to kelly 26. Kelly 26 passes through rotary table 27. Rotary table 27 provides torque to kelly 26 and thereby rotates drill string 12 and drill bit 14. A drill line 29 and a swivel 31 may be provided to support kelly 26 and drill string 12. In some embodiments, a top drive is used to provide torque rather than a rotary table.

A signal receiving assembly 30 is mounted at or above the top end of kelly 26. Signal receiving assembly 30 comprises a first part 30A coupled to kelly 26 and a second part 30B that is electrically insulated from first part 30A by an electrically-insulating gap 30C. In some embodiments, electrically-insulating gap 30C is at least 1 inch (2.5 cm) long. Signal receiving assembly 30 may, for example, have a structure that is like a gap sub. In some embodiments the assembly does not need to be as large as some gap subs, and can be of a smaller size. The top end of signal receiving assembly 30 may be closed. In some embodiments, signal receiving assembly 30 is mounted above a fitting at which drilling fluid is pumped into drill string 12 and is in electrical communication with drill string 12 by way of the fitting.

Second part 30B of signal receiving assembly 30 is grounded, for example by being connected directly or indirectly to the grounding system for the drill rig. A signal detector 13 is electrically coupled between first and second parts 30A and 30B of signal receiving assembly 30. The wires making up these couplings may be routed with other drill rig cables so that they are kept out of harm's way. The wires making up these couplings may comprise standard electrical wiring, coaxial cable, low noise cable, or the like.

In some embodiments, signal receiving assembly 30 is mounted to rotate (for example, mounted to a kelly that turns). In such embodiments, if signal detector 13 is not mounted to rotate with signal receiving assembly 30, signal detector 13 may be electrically connected to signal receiving assembly 30 by suitable rotating electrical couplings. For example, signal detector 13 may be electrically coupled to rotating components via a sliding connection (e.g. a brush, etc.). Signal detector 13 may be electrically coupled to non-rotating components (e.g. a swivel, a gooseneck, kelly hose, etc.) via directly wired connections (e.g. a soldered connection, a bolted connection, etc.). In some embodiments (e.g. the embodiment in FIG. 4), signal detector 13 or parts thereof may be mounted within signal receiving assembly 30 and may rotate with signal receiving assembly 30. In such embodiments, signal detector 13 may be electrically coupled to rotating components via directly wired connections, or via conductive structures used to mount signal detector 13 to signal receiving assembly 30. In some such embodiments signal detector 13 may transmit data wirelessly.

In some embodiments, signal detector 13 is also electrically connected to blow out preventer 17. When the signal detector 13 cannot detect a signal via the connection to first part 30A (e.g. when drill string 12 is disconnected from kelly 26), signal detector 13 may detect a telemetry signal via the connection to blow out preventer 17.

In some embodiments, signal receiving assembly 30 includes components which provide some functions of signal detector 13 and/or pre-process a signal before the signal is transmitted to signal detector 13. For example, a pre-processor may include an amplifier, analog to digital converter, signal conditioning circuits, or the like. Separate circuitry may be provided for each telemetry mode. In some embodiments, the circuitry at signal receiving assembly 30 comprises a network interface (such as an Ethernet interface or the like) which is configured to transmit data collected from the circuits at signal receiving assembly 30 to signal detector 13 for further processing and or display. The network interface may transmit data by wired or wireless connections. In such embodiments, one or more signal detectors 13 may be located at locations in or around the drill rig or at any other locations at which the data is accessible.

In some embodiments signal receiving assembly 30 includes a signal generator for transmitting downlink EM telemetry signals. The signal generator may, for example, comprise a power supply and an H-bridge circuit connected to apply potential from the power supply between the first and second parts 30A and 30B in either of two polarities. The signal generator may control the H-bridge circuit to reverse those polarities at a desired frequency or frequencies in a pattern which encodes data for transmission downhole.

In some embodiments, all or a portion of signal receiving assembly 30 and/or signal detector 13 is integrated into a top drive for receiving and/or transmitting EM signals. Signal receiving assembly 30 may be located within a top drive, attached to a top drive, or mounted immediately adjacent to a top drive, for example. In embodiments where signal receiving assembly 30 is integrated into the top drive, signal detector 13 may optionally utilize data connections to the top drive to carry data from signal receiving assembly 30. For example, input/output apparatus such as fiber optic cabling, Ethernet cabling, wireless connections, etc. may carry data both to and from the top drive and to and from signal receiving assembly 30. In some embodiments, signal receiving assembly 30 shares a network interface and/or data communication cables also used by the top drive to connect with a rig network.

In some embodiments, signal detector 13 is connected to signal receiving assembly 30 by way of cables that are routed together to the vicinity of the top end of kelly 26 or a top drive together with other cables associated with the drill rig. These cables may be left installed on the drill rig and extend to a convenient location for signal detector 13 so that signal detector 13 can be conveniently installed by attaching it to the cable ends when reception of EM telemetry signals is desired. These cables may be co-routed with other cables, such as fibre optic or Ethernet cables. In some embodiments, these cables are co-routed with cables associated with a top drive. Telemetry signals may thereby be received at the same computer which interacts with the top drive.

In some embodiments, signal detector 13 (or another apparatus) may be capable of generating signals for transmission of EM telemetry signals from the surface to a downhole detector. Such apparatus may be configured to apply such signals between parts 30A and 30B of signal receiving assembly 30. Such embodiments facilitate two way communications between the surface and downhole devices. A downhole signal receiving assembly (not shown) may detect the signals generated by signal detector 13. The downhole signal receiving assembly may be integrated into a downhole probe. Applying the signals at the top of the kelly may have some benefits such as safety benefits of protecting people from shock potential.

Signal detector 13 may be configured to apply a voltage across parts 30A and 30B of signal receiving assembly 30. Information may be encoded into a signal comprising a particular pattern of variations of voltage. Information may be sent downhole for a variety of purposes, including adjusting the settings of downhole components such as probes and drill bits.

In some embodiments of the invention, signal detector 13 detects a signal from a downhole location, sends the signal to a processor for a processing operation, and then generates a signal encoding the result of the processing operation for detection at the downhole location.

Signal receiving assembly 30 may be configured to receive simultaneously two or more different types of telemetry signals. For example, in the illustrated embodiment, signal receiving assembly 30 comprises a pressure sensor 40 that can detect changes in the pressure of the drilling fluid within the bore of drill string 12. Such pressure changes may be generated by a downhole mud pulse telemetry system. Signals from pressure sensor 40 may be carried by a cable to signal detector 13. As another example, signal receiving assembly 30 may comprise an acoustic sensor 42 (e.g. an accelerometer, transducer, or the like) for detecting signals transmitted up the drill string by drill string acoustic telemetry. Acoustic sensor 42 may, for example, be in acoustic contact with first part 30A or second part 30B of signal receiving assembly 30. Signals from acoustic sensor 42 may be carried by a cable to signal detector 13. Cables may be connected to signal receiving assembly 30 using low noise, direct electrical connections or by soldering in posts.

Figure 3:
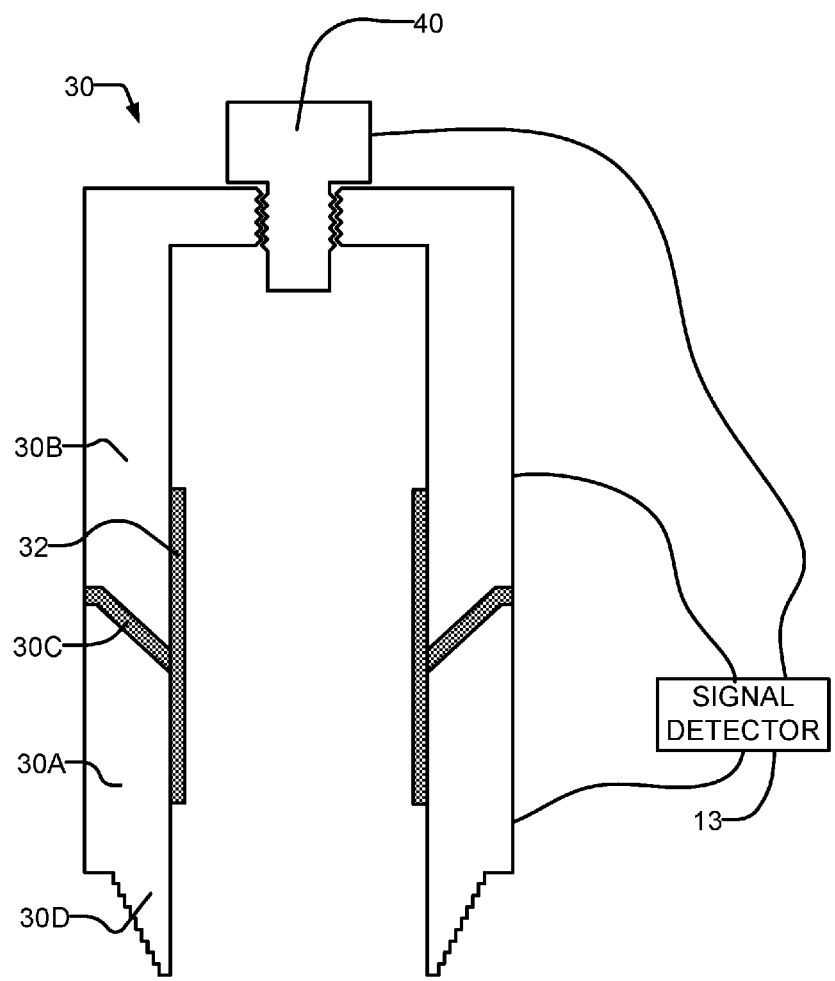
FIG. 3 is a schematic view showing an example embodiment of a signal receiving assembly configured for receiving EM and MP telemetry signals.

FIG. 3 shows a signal receiving assembly 30 according to a more detailed example embodiment. In this embodiment, gap 30C is provided by an electrically insulating material filling a space between two electrically-conductive parts. Because signal receiving assembly 30 is not exposed to harsh downhole conditions the construction of signal receiving assembly 30 may be less robust than the construction of a gap sub designed for downhole use, and thereby more economical to build and service.

An insulating material 32 may be applied to the interior of signal receiving assembly 30 spanning gap 30C. Insulating material 32 may improve the insulation between first part 30A and second part 30B. In some embodiments, the interior of signal receiving assembly 30 is filled with drilling fluid. Insulating material 32 may increase the distance that current has to travel through the drilling fluid in order to pass between first part 30A and second part 30B. A long section of insulating material 32 may improve the quality (e.g. by reducing attenuation and noise) of the signal detected or transmitted by signal detector 13. Where there is no drilling fluid within signal receiving assembly 30 (e.g. in air drilling operations), insulation material 32 may be of lesser benefit. In some embodiments, insulating material 32 is at least 1 inch (2.5 cm) long.

In the illustrated embodiment, signal receiving apparatus 30 comprises a coupling 30D configured for coupling signal receiving apparatus 30 to a drill string, kelly, or any other structure which is electrically coupled to the drill string. Coupling 30D may, for example, comprise a threaded coupling, a hammer union coupling, a national pipe thread coupling, or the like. An example of a threaded coupling that may be provided on signal receiving apparatus 30 is an API threaded coupling. The illustrated embodiment shows coupling 30D as being a male tapered threaded coupling. Coupling 30D may have other configurations. In other embodiments, there is no coupling 30D and first part 30A of signal receiving assembly 30 is integrally formed with kelly 26 or is integrally formed with a section of drill string. In other embodiments, signal receiving assembly 30 is integrated with or otherwise provided within a top drive. For example, in some embodiments, the service cap on the top of the top drive goose neck can be unscrewed and the signal receiving assembly 30 can then be threaded into place. The service port typically uses a standard threaded coupling such as national pipe thread coupling or the like, so the signal receiving assembly 30 may be made to conform with such coupling standard. In other embodiments, the signal receiving assembly 30 could be built directly into the top drive.

An advantage of some embodiments is that signal receiving assembly 30 is directly coupled to the drill string and may therefore provide better signal quality than can be obtained by measuring the potential of a blow out preventer relative to ground. Another advantage of some embodiments is that setting up a system to receive telemetry signals from downhole and/or to transmit telemetry signals from the surface is dramatically simplified. There may be fewer ports, less attenuation, less noise, less error, and/or lower cost.

Another advantage of some embodiments is that no service technician is needed to install grounding rods or to install cables between the grounding rods and a signal detector. The signal detector may be a 'permanent' part of the drill rig.

Figure 4:
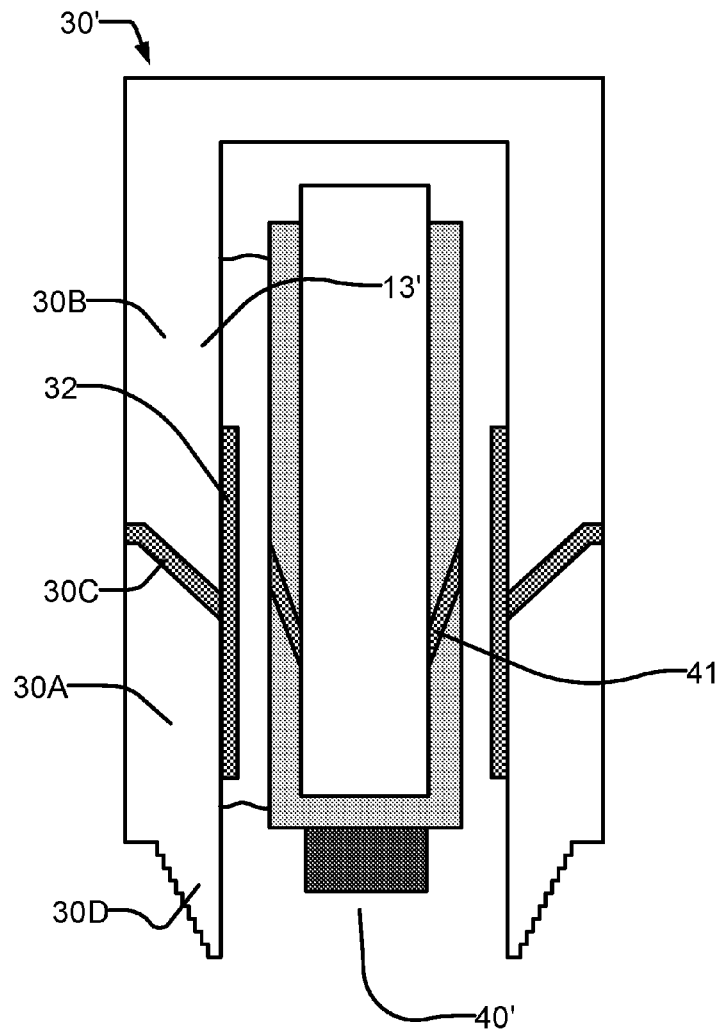
FIG. 4 is a schematic view showing an alternative embodiment of a signal receiving assembly with an integrated signal detector.

In an alternative embodiment illustrated in FIG. 4, signal detector 13' is mounted within signal receiving assembly 30'. In some embodiments, signal detector 13' may be encased within a pressure rated housing. Signal detector 13' contains an electrically insulating gap 41 which electrically insulates the portions of signal detector 13' which are coupled to first and second parts 30A and 30B, respectively. Signal detector 13' may be configured to transmit or receive data via either a wired or wireless connection.

In some embodiments, signal detector 13 (or 13') is configured to transmit a signal which is detectable at a downhole location. Signal detector 13 (or 13') may be configured to drive a voltage across first part 30A and second part 30B. A safety switch downlink feature may prevent signal detector 13 (or 13') from transmitting a signal when the drill rig is not actively drilling. For example, when a pressure sensor or transducer detects drilling fluid pressure to be below some threshold amount, this may cause a safety switch to be activated to prevent signal detector 13 (or 13') from driving a voltage across first part 30A and second part 30B. In the embodiment illustrated in FIG. 4, a pressure transducer 40' is mounted directly to signal detector 13'. Pressure transducer 40' may also be used to receive mud pulse telemetry signals.

Figure 5:
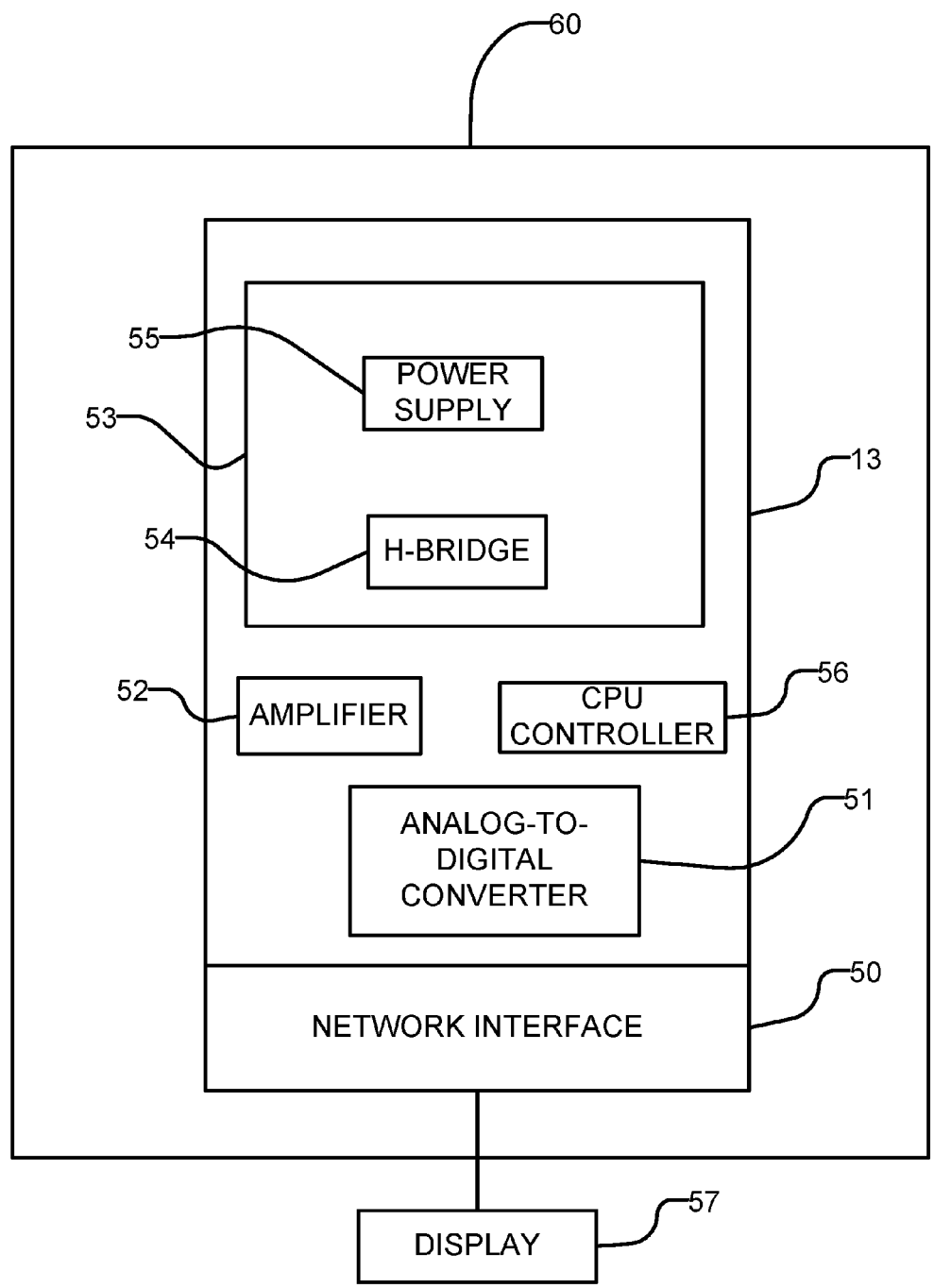
FIG. 5 is a schematic view of an example signal detector.

FIG. 5 shows schematically an example signal detector 13. Signal detector 13 may comprise several components, including a network interface 50, an analog-to-digital converter 51, an amplifier 52, a central processing unit (CPU) controller 56, and a signal generator circuit 53. Signal generator circuit 53 may comprise several components, for example power supply 55 and H-bridge 54. Signal detector 13 is mounted within a top drive 60. Signal detector 13 may be coupled to a display 57 via network interface 50. In some embodiments, display 57 is integrated with signal detector 13. In some embodiments, display 57 is a decoder display.

Signal generator 18 may generate EM telemetry signals which are sufficiently powerful to be detected at the surface. Signal receiving assembly 30 may be able to detect relatively lower power EM telemetry signals compared to some prior art signal receiving assemblies, and therefore the use of signal receiving assembly 30 may allow signal generator 18 to be operated at relatively low power. This may extend the life of the energy source (e.g. battery) of signal generator 18. In the alternative, signal generator 18 may be effective to transmit data that can be received by a signal detector 13 by way of signal receiving assembly 30 from greater depths.

In some embodiments, signal receiving assembly 30 is constructed to transmit significant torques (e.g. in embodiments where signal receiving assembly 30 forms part of a drill string which is below a device used to provide torque to the drill string).

In some embodiments, second part 30B of signal receiving assembly 30 comprises a coupling (not shown) for coupling to a section of drill string, kelly, or other structure. This coupling may, for example, comprise a threaded coupling, a hammer union coupling, a national pipe thread coupling, or the like. In some embodiments, both first part 30A and second part 30B are connected to sections of drill string. In some embodiments, first part 30A is connected to a separate cap or a section of drill string and second part 30B is connected to a kelly.

An example embodiment provides a self-contained or nearly self-contained signal receiving assembly configured for direct coupling into a drill string at or near a top end of the drill string. The signal receiving assembly comprises first and second electrically conductive members. The second electrically-conducting member comprises a threaded or other coupling configured for attachment into a drill string. The first electrically-conducting member is electrically insulated from, but mechanically connected to the second electrically-conductive member. The first electrically-conductive member comprises a grounding connection such as a ground clamp or the like. The grounding connection may comprise a rotating electrical coupling.

In an example embodiment, the first member is tubular and the second member comprises or is configured to receive a cap closing off one end of the tubular first member. The signal receiving assembly comprises receivers for at least one type of data telemetry. For example, the signal receiving assembly may comprise receivers for one, two or more of EM telemetry, MP telemetry and acoustic telemetry.

In an example embodiment, the EM telemetry receiver comprises a circuit connected to monitor a potential difference between the first and second electrically conductive members. The MP telemetry receiver may comprise a pressure transducer which may advantageously be mounted on the cap portion of the second member. The acoustic telemetry receiver may comprise an acoustic sensor (microphone or accelerometers) in acoustic contact with the first electrically conductive member.

The signal transmitting assembly may optionally comprise signal generating electronics configured to apply electrical signals for downhole EM telemetry between the first and second electrically conductive members. In example embodiments the signal receiving assembly comprises a data transmitter such as an Ethernet interface, a WiFi data transceiver or another wired or wireless data transmission/receiving interface. In such embodiments, received telemetry data may be digitized and transmitted as data signals on an available data transmission network.

An advantage of some embodiments is that they may be installed once and subsequently used for data telemetry as required. In cases where data telemetry is not required the signal receiving assembly is out of the way of drilling operations. The assembly may provide receivers suitable for any mode(s) of telemetry that is expected to be used.

Suitable displays and/or other equipment for displaying, processing and/or recording telemetry data or for originating data to be communicated downhole by telemetry may be installed simply by placing it in data communication with the signal receiving assembly. Where the signal receiving assembly integrates electronics and telemetry transducers into one package, installation and/or removal of the signal receiving assembly may be simplified.

The gooseneck service port located at the top drive is generally the location where bubbles would get caught in the drill string if any were to be stuck. The use of embodiments as described above incorporating a pressure rated housing and downhole probe may ensure that the bore of the apparatus fills with drilling fluid for good reception of mud pulse telemetry, by providing the ability to protrude the transducer deep into the flow of fluid so that all compressible gases are caught up in the gooseneck service location in the top drive. In some embodiments, a vent may be provided in the top drive.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

LIST OF REFERENCES 10 drill rig
10A derrick
10B rig floor
10C draw works
12 drill string
12A lower portion
12B upper portion
13 signal detector
13' signal detector
13A signal cables
13B grounding stakes
14 drill bit
15 annular region
16 casing
17 blow out preventer
18 signal generator
20 gap sub
22 ground
25 drilling fluid
26 kelly
27 rotary table
29 drill line
30 receiving assembly
30A first part
30B second part
30C electrically-insulating gap
30D coupling
31 swivel
32 insulating material
40 pressure sensor
40' pressure transducer
41 electrically insulating gap
42 acoustic sensor
50 network interface
51 analog-to-digital converter
52 amplifier
53 signal generator circuit
54 H-bridge
55 power supply
56 central processing unit (CPU)
57 display
60 top drive

INTERPRETATION OF TERMS

Unless the context clearly requires otherwise, throughout the description and the claims (where present):

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back", "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g., a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. An apparatus for detecting uplink telemetry signals in a drilling operation, the apparatus comprising:
    a signal receiving apparatus coupled to rotate with an upper end of a rotatable drill string having a bore, the signal receiving apparatus comprising an amplifier connected to amplify an electrical potential difference between the upper end of the drill string and an electrical ground reference; and
    a signal detector electrically coupled to a first section of the signal receiving apparatus, a second section of the signal receiving apparatus which is electrically isolated from the first section, and a blow out preventer, wherein the signal detector is configured to measure a difference in voltage between the first section and the second section and a difference in voltage between the second section and the blow out preventer;
    wherein the signal receiving apparatus comprises a threaded coupling and is threadedly attached to a corresponding threaded coupling at the upper end of the drill string; and
    wherein the threaded coupling is on the first section and the first section comprises a tubular first electrically-conductive section of the signal receiving apparatus; the second section of the signal receiving apparatus comprises a second electrically-conductive section concentric with and electrically insulated from the first electrically-conductive section; and the second electrically-conductive section is connected to the electrical ground reference.

2. The apparatus according to claim 1 wherein the signal receiving assembly is configured to receive and transmit signals by way of Ethernet, fibre optic or wireless communications links.

3. The apparatus according to claim 1 wherein the signal receiving assembly is mounted immediately adjacent to a top drive.

4. The apparatus according to claim 1 wherein the signal receiving assembly is mounted within a top drive.

5. The apparatus according to claim 1 wherein the signal receiving assembly is integrated with a top drive.

6. The apparatus according to claim 1 wherein the threaded coupling is an American Petroleum Institute (API) threaded coupling.

7. The apparatus according to claim 1 wherein the second electrically-conductive section is in fluid communication with the bore of the drill string.

8. The apparatus according to claim 1 comprising a wireless data transmitter connected to wirelessly transmit an uplink telemetry signal amplified by the amplifier to surface equipment.

9. The apparatus according to claim 1 comprising a downlink telemetry signal generator connected to apply downlink telemetry signals between the upper end of the drill string and the electrical ground reference.

10. The apparatus according to claim 9 wherein the downlink telemetry signal generator comprises an H-bridge circuit.

11. The apparatus according to claim 1 comprising a fitting at which drilling fluid is pumped into the drill string wherein the signal receiving apparatus is above the fitting and is in electrical communication with drill string by way of the fitting.

12. The apparatus according to claim 1 wherein the signal receiving apparatus comprises a pressure transducer mounted to detect a pressure of fluid within the bore of the drill string.

13. An apparatus for detecting uplink telemetry signals in a drilling operation, the apparatus comprising:
    a signal receiving apparatus coupled to rotate with an upper end of a rotatable drill string having a bore,
    wherein the signal receiving apparatus comprises a threaded coupling and is threadedly attached to a corresponding threaded coupling at the upper end of the drill string
    wherein the threaded coupling is on a tubular first electrically-conductive section of the signal receiving apparatus; the signal receiving apparatus comprises a second electrically-conductive section concentric with and electrically insulated from the first electrically-conductive section; and the second electrically-conductive section is connected to an electrical ground reference;
    a signal detector electrically coupled to the second section, the first section, and a blow out preventer, the signal detector configured to measure a difference in voltage between the second section and the first section and a difference in voltage between the second section and the blow out preventer;
    wherein the signal receiving apparatus comprises an amplifier connected to amplify an electrical potential difference between the upper end of the drill string and the electrical ground reference.

14. The apparatus according to claim 13 comprising a bore through the first electrically-conductive section.

15. The apparatus according to claim 14 wherein the bore extends at least part way through the second electrically-conductive section.

16. The apparatus according to claim 14 wherein the signal detector is mounted within the bore of the first electrically-conductive section.

17. The apparatus according to claim 14 wherein the second electrically-conductive section is electrically insulated from the first electrically-conductive section by a gap filled with a dielectric material, and wherein a sleeve of insulating material lines at least a portion of the bore through the first and second electrically-conductive sections.

18. The apparatus according to claim 17 wherein the sleeve of insulating material is at least 1 inch (2.5 cm) long.

19. The apparatus according to claim 17 wherein the gap of insulating material is at least 1 inch (2.5 cm) long.

20. The apparatus according to claim 13 comprising a pressure sensor wherein the signal detector is configured to detect a signal from the pressure sensor.

21. The apparatus according to claim 13 comprising an acoustic sensor wherein the signal detector is configured to detect a signal from the acoustic sensor.

22. The apparatus according to claim 13 comprising an accelerometer wherein the signal detector is configured to detect a signal from the accelerometer.

23. The apparatus according to claim 13 wherein the signal detector comprises an amplifier.

24. The signal receiving assembly apparatus according to claim 13 wherein the signal detector comprises an analog-to-digital converter.

25. The signal receiving assembly according to claim 13 wherein the signal detector comprises a network interface.

26. The apparatus according to claim 13 wherein the signal detector comprises a CPU controller.

27. The apparatus according to claim 13 wherein the second electrically-conductive section is in fluid communication with the bore of the drill string.

28. The apparatus according to claim 13 comprising a wireless data transmitter connected to wirelessly transmit an uplink telemetry signal amplified by the amplifier to surface equipment.

29. The apparatus according to claim 13 comprising a downlink telemetry signal generator connected to apply downlink telemetry signals between the between the upper end of the drill string and the electrical ground reference.

30. The apparatus according to claim 29 wherein the downlink telemetry signal generator comprises an H-bridge circuit.

31. The apparatus according to claim 13 comprising a fitting at which drilling fluid is pumped into the drill string wherein the signal receiving apparatus is above the fitting and is in electrical communication with drill string by way of the fitting.

32. The apparatus according to claim 13 wherein the signal receiving apparatus comprises a pressure transducer mounted to detect a pressure of fluid within the bore of the drill string.

33. The apparatus according to claim 13 wherein the signal detector comprises a signal generator circuit, and the signal generator circuit is configured to not drive a voltage across the first and second sections unless the pressure sensor detects at least a threshold pressure.

* * * * *